United States Patent
Miyasako (10) Patent No.: US 7,583,889 B2
(45) Date of Patent: Sep. 1, 2009

(54) IMAGING APPARATUS

(75) Inventor: Kenichi Miyasako, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 448 days.

(21) Appl. No.: 11/350,154

(22) Filed: Feb. 8, 2006

(65) Prior Publication Data

US 2006/0177209 A1 Aug. 10, 2006

(30) Foreign Application Priority Data

Feb. 9, 2005 (JP) ............... 2005-033666

(51) Int. Cl.
*G03B 13/18* (2006.01)
(52) U.S. Cl. .................... 396/55; 348/208.4
(58) Field of Classification Search ............ 396/52–55; 348/208.99, 208.4
See application file for complete search history.

(56) References Cited

U.S. PATENT DOCUMENTS

| | | | |
|---|---|---|---|
| 5,534,967 A * | 7/1996 | Matsuzawa | 396/55 |
| 5,771,404 A * | 6/1998 | Katayama et al. | 396/52 |
| 5,835,798 A * | 11/1998 | Kitagawa | 396/55 |
| 5,878,286 A * | 3/1999 | Tomita et al. | 396/53 |
| 6,963,361 B1* | 11/2005 | Kawahara et al. | 348/208.99 |

FOREIGN PATENT DOCUMENTS

JP 10-090743 4/1998

* cited by examiner

*Primary Examiner*—Christopher E Mahoney
*Assistant Examiner*—Fang-Chi Chang
(74) *Attorney, Agent, or Firm*—Straub & Pokotylo; John C. Pokotylo (57) ABSTRACT

In an imaging apparatus with the capability of calculating a reference value for shake compensation from a shake detecting signal, the calculation for the reference value is changed under certain conditions. To be more specific, for example, the imaging apparatus, which has a shake detection portion for detecting a shake of the imaging apparatus about two different axes perpendicular to an imaging optical axis, includes a first reference value calculation portion for calculating a first reference value using a shake detecting signal from the shake detection portion, and a second reference value calculation portion for calculating a second reference value for the shake detecting signal different from that calculated by the first reference value calculation portion. In the imaging apparatus, the second reference value calculation portion changes the calculation of the second reference value based on a value related to the first reference value.

2 Claims, 12 Drawing Sheets

IMAGING APPARATUS

CROSS-REFERENCE TO RELATED APPLICATION

This application is based upon and claims the benefit of priority from prior Japanese Patent Application No. 2005-033666, filed on Feb. 9, 2005, the entire contents of which are incorporated herein by reference.

BACKGROUND OF THE INVENTION

1. Field of the Invention

The present invention relates to an imaging apparatus with a shake compensation function for detecting and compensating for shake of the imaging apparatus.

2. Description of the Related Art

Among conventional imaging apparatuses with shake compensation, there are cameras, for example.

An anti-shake function for suppressing image blur on an imaging plane is known as a shake compensation function implemented in a camera. The anti-shake function uses angular velocity sensors or the like to detect camera shake in pitch and yaw directions, respectively. Then, based on their output signals, part of an image taking optical system or an image pickup element is shifted independently in directions to cancel out the horizontal and vertical camera movements on a plane perpendicular to an optical axis, thereby compensating for camera shake.

The angular velocity sensor used in a video or still camera for detecting camera shake is small and cheap, but it could superpose a drift component on the output signal. The drift component is a change of the voltage when the angular velocity is null (that is, a change of the output signal when the camera is at rest) mainly caused by a change in ambient temperature. In this case, it is necessary to remove the drift component because it results in an error in camera shake detection.

Figure 12:
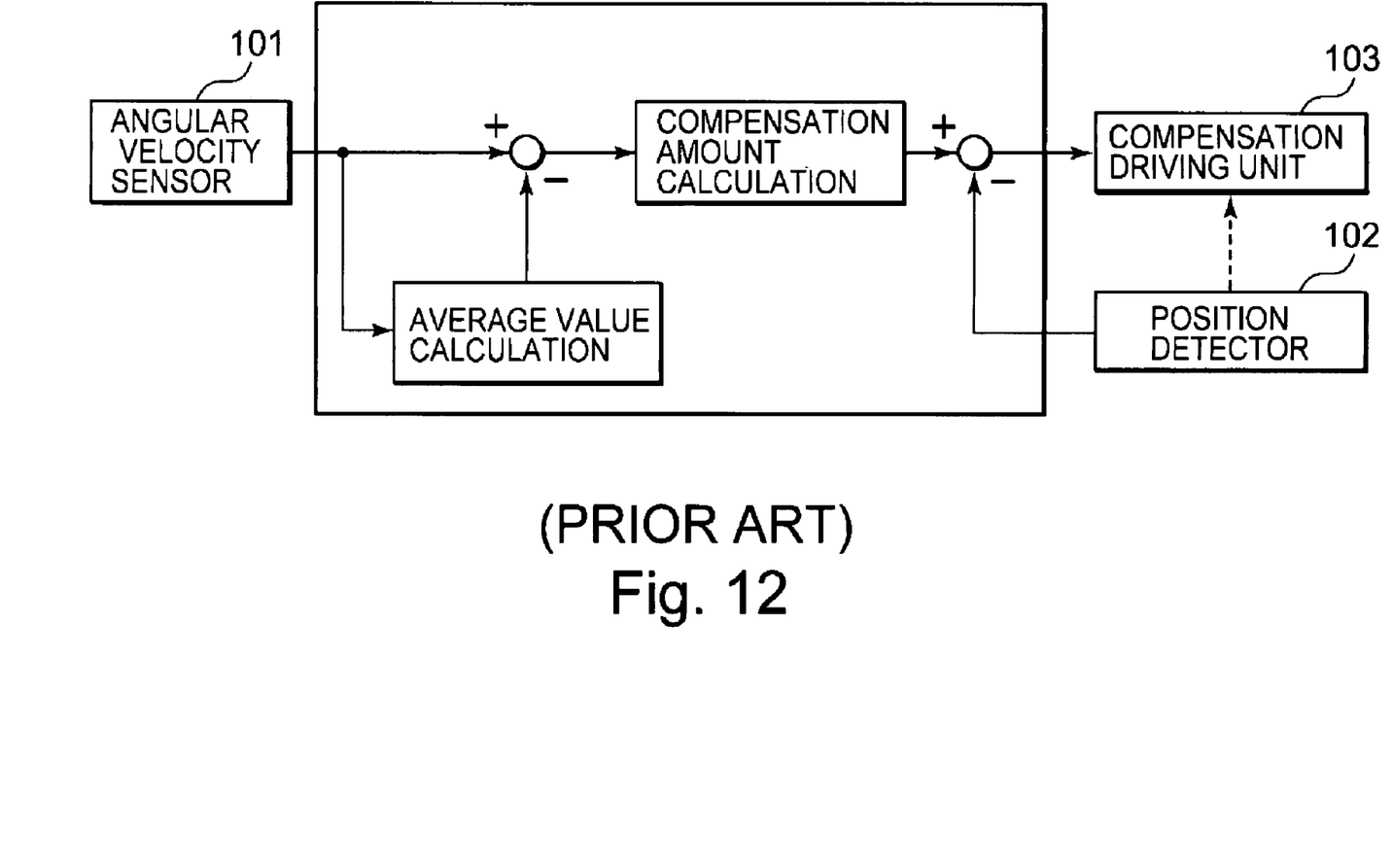
FIG. 12 is a block diagram for explaining a conventional method of removing a drift component.

For example, one of methods for removing the drift component is disclosed in Japanese Patent Laid-Open No. 10-90743. In this method, as shown in FIG. 12, the moving average value of an output signal from an angular velocity sensor 101 is calculated to determine a reference value at which the angular velocity goes to zero, and the reference value is subtracted from the output signal from the angular velocity sensor 101 to remove the drift component. Then, using the subtracted value, an integral operation is performed to convert the angular velocity signal to an angular displacement signal so as to calculate the amount of compensation while taking into account camera information such as the focal length of an imaging lens. Then, from target driving position information on an anti-shake lens obtained as the calculation result, position information on the anti-shake lens detected by a position detector 102 is subtracted, and the subtracted value is output to a compensation driving unit 103 to compensate for camera shake.

The camera-shake compensation includes motion picture compensation applied to the compensation during framing operation for moving picture capturing or still picture capturing, and still image compensation applied to the compensation during an exposure process. Both are required to achieve different levels of compensation performance. The still image compensation is required to fully compensate for image blur caused during the exposure, while motion picture compensation is required to keep an acceptable level of compensation performance for a long period of time, but not necessarily required to achieve the perfect compensation.

Figure 4A:
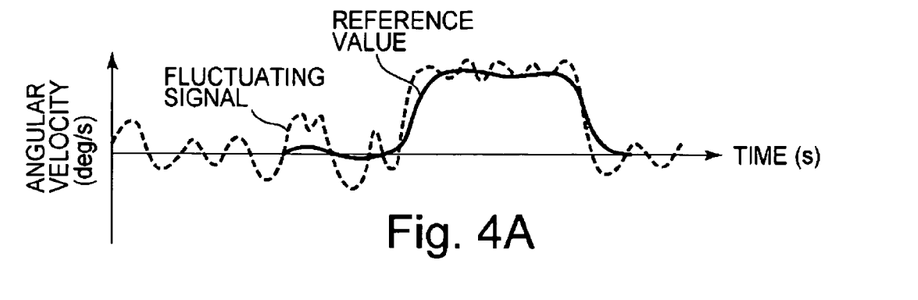
FIG. 4A is a graph showing such a case that a reference value varies following low-frequency components of a fluctuating signal.
Figure 4B:
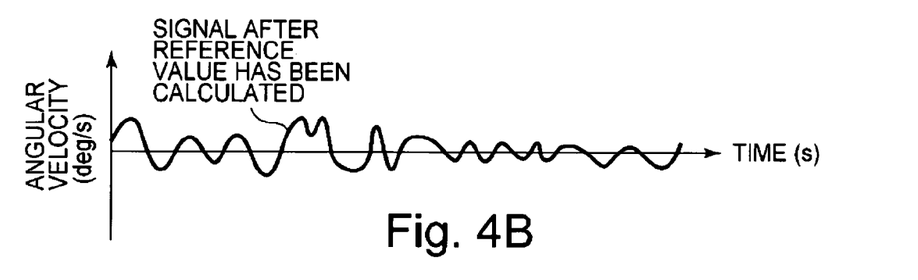
FIG. 4B is a graph showing an example of a fluctuating signal from which the reference value has been subtracted.

Therefore, in order to compensate for motion picture blur, it is preferable to mainly compensate for high-frequency fluctuating components of relatively small amplitude. In other words, in case of motion picture compensation, if the reference value is drastically changed in response to a big fluctuation in the output signal from the angular velocity sensor as shown in FIG. 4A, it is enough to compensate only for high-frequency components of the fluctuating signal from which the reference value has been subtracted as shown in FIG. 4B.

On the other hand, in case of still image compensation, an image without the effects of camera shake causing image blur cannot be obtained unless the reference value agrees with an angular velocity value of zero.

BRIEF SUMMARY OF THE INVENTION

The present invention provides an imaging apparatus with the capability of calculating a reference value for shake compensation from a shake detecting signal, in which the calculation for the reference value can be changed under certain conditions. The change of the calculation can be, but not limited to, the change of the method, process, logic, parameters of the calculation. The change of the calculation also can be a temporary pause of the calculation. For example, if a big shake of the imaging apparatus has occurred, the calculation for the reference value can be changed (for example, the calculation for the reference value is temporary stopped until the big shake ends) to reduce the shake compensation error caused by the big shake.

In one aspect of the present invention, there is provided an imaging apparatus having a shake detection portion for detecting a shake of the imaging apparatus about two different axes perpendicular to an imaging optical axis. The imaging apparatus includes a first reference value calculation portion for calculating a first reference value using a shake detecting signal from the shake detection portion, and a second reference value calculation portion for calculating a second reference value for the shake detecting signal different from that calculated by the first reference value calculation portion. In the imaging apparatus, the second reference value calculation portion can change the calculation of the second reference value based on a value related to the first reference value.

For example, the imaging apparatus can be configured such that the first reference value calculation portion calculates a reference value for motion picture compensation and the second reference value calculation portion calculates a reference value for still image compensation.

The calculations using the second reference value calculation portion for the second reference value and the calculations using the first reference value calculation portion for the first reference value can be performed concurrently.

The imaging apparatus can also include a shake compensation amount calculation portion for calculating the amount of shake compensation based on the output of the shake detection portion, and a shake compensation unit driven based on the output of the shake compensation amount calculation portion. In this case, the shake compensation amount calculation portion can be configured to calculate the amount of shake compensation using the first reference value before the start of still image capturing and using the second reference value after the start of still image capturing.

If the imaging apparatus has a motion picture capturing mode for capturing motion picture as one of its operation modes, the shake compensation amount calculation portion may calculate the amount of shake compensation using the first reference value or the second reference value calculation portion may stop calculating in the motion picture capturing mode.

The imaging apparatus can further include a reference value calculation changing portion for changing, based on the first reference value, the calculation performed by the second reference value calculation portion; a first shake compensation portion driven based on the amount of shake compensation calculated based on the output of the shake detection portion and the first reference value; and a second shake compensation portion driven based on the amount of shake compensation calculated based on the output of the shake detection portion and the second reference value. In this case, the second reference value calculation portion can be configured to change the calculation for the second reference value based on a value related to the first reference value.

In another aspect of the present invention, there is provided an imaging apparatus including a sensor for detecting a shake of the imaging apparatus, a microcomputer for performing processing for lowering frequency components with respect to the output of the sensor to determine a reference value for shake compensation, and a mechanism to compensate for shake of the imaging apparatus using the output of the sensor and the calculation results of the microcomputer. In this configuration, when a big shake exceeding a predetermined magnitude has occurred during shake compensation through the mechanism, the microcomputer performs processing for preventing or at least reducing the influence of the big shake on the reference values.

According to the present invention, there is provided an imaging apparatus with an anti-shake function, which performs shake compensation suited to motion picture capturing while reducing the influence of a reference value calculation error caused by a big shake during still image capturing, thereby making it possible to compensate for shake of the imaging apparatus with a high degree of accuracy.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Preferred embodiments of the invention are described below with reference to the accompanying drawings.

Figure 1:
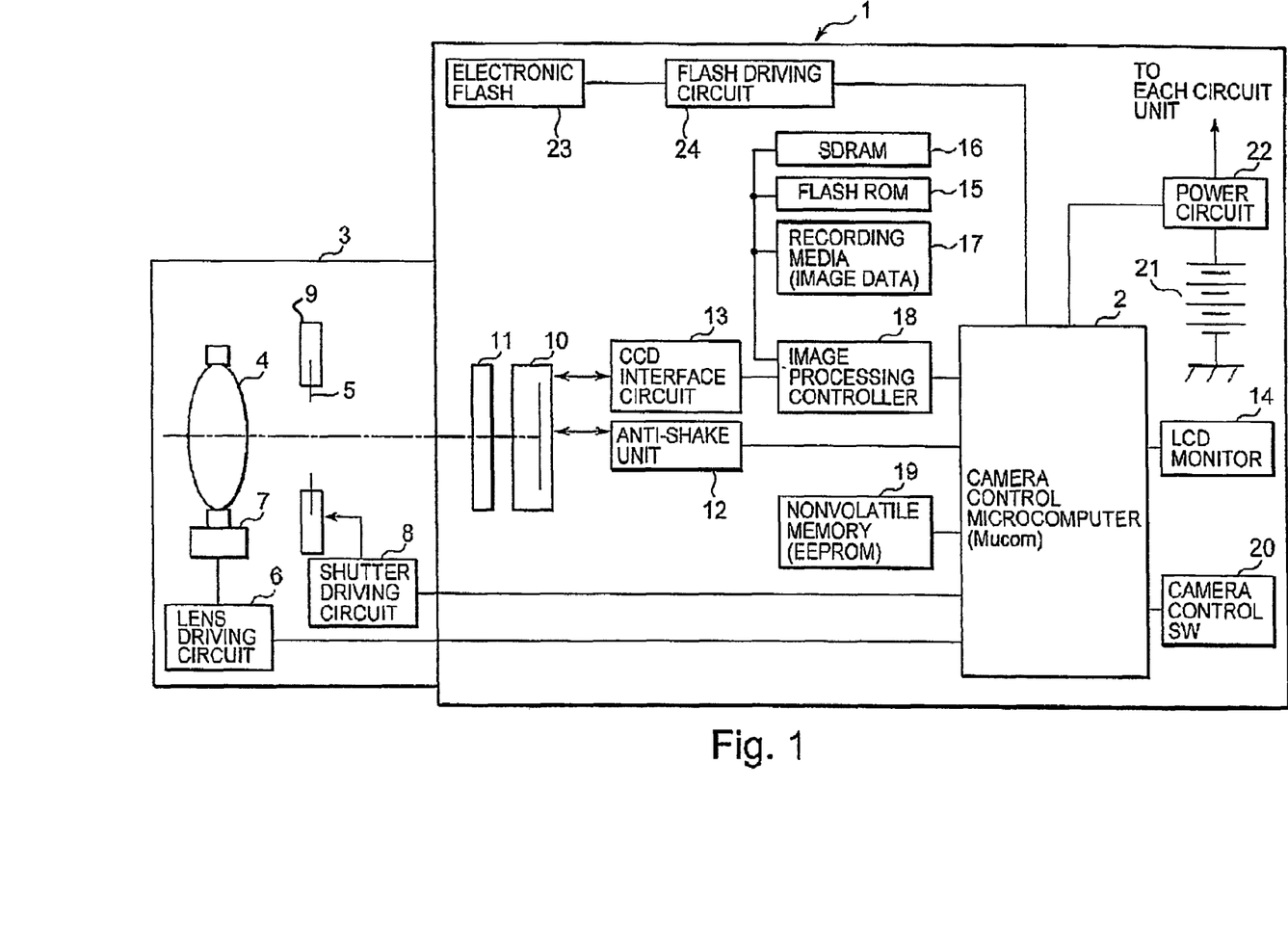
FIG. 1 is a block diagram showing the principle configuration of a digital camera as an imaging apparatus according to a first embodiment of the present invention.

FIG. 1 is a block diagram showing the principle configuration of a digital camera as an imaging apparatus according to a first embodiment of the present invention.

In a digital camera 1 shown in FIG. 1, a camera control microcomputer (hereinafter called "Mucom") 2 controls the entire operation of the camera 1.

An imaging lens 4 and a shutter 5 are provided in a lens unit 3. The imaging lens 4 is driven by a motor, not shown, in a lens driving mechanism 7 in response to the output of a lens driving circuit 6 to adjust zoom, focus, etc. The shutter 5 is driven by a motor, not shown, in a shutter driving mechanism 9 in response to the output of a shutter driving circuit 8.

A CCD unit 10 as a photoelectric conversion element is provided on an optical axis to photoelectrically convert a subject image passing through the above-mentioned optical system. An optical lowpass filter 11 is provided between the CCD unit 10 and the imaging lens 4. Upon capturing, the shutter 5 is driven through the shutter driving circuit 8 to allow a beam of light passing through the imaging lens 4 to pass and form an image on the imaging plane of the CCD unit 10.

An anti-shake unit 12 moves the CCD unit 10 in accordance with instructions from the Mucom 2 to compensate for shake of the camera 1. The details of camera-shake compensation will be described later.

The camera 1 is also provided with a CCD interface circuit 13 connected to the CCD unit 10 and a LCD monitor 14. Further, the camera 1 is provided with a flash ROM 15, an SDRAM 16, recording media 17, etc. as memory areas for storing a control program for the camera 1, etc. An image processing controller 18 is provided for image processing using these memory areas, providing an electronic recording/display function as well as an electronic capturing function.

As still another memory area, a nonvolatile memory unit for storing predetermined control parameters necessary for camera control, for example, a nonvolatile memory 19 such as EEPROM is provided accessibly from the Mucom 2.

The image processing controller 18 controls the CCD interface circuit 13 in accordance with instructions from the Mucom 2 to capture image data from the CCD unit 10. The image processing controller 18 converts the image data to a video signal, and outputs the video signal onto the LCD monitor 14, allowing the user to check the image shot in the image displayed on the LCD monitor 14. The SDRAM 16 is a memory for temporary storage of image data and used as a work area for image data conversion and the like. The image data is stored in JPEG format on the recording media 17.

The Mucom 2 is provided with a camera control SW 20, which is a set of switches including operation buttons necessary for camera operations such as a release SW, a mode change SW, a power SW, etc.

The camera is further provided with a battery 21 as a power source, a power circuit 22 for supplying power by converting the output voltage from the power source to a voltage necessary for each of the circuit units constituting the camera 1, an electronic flash 23 which fires instantly, and a flash driving circuit 24 for driving the electronic flash 23.

Figure 2:
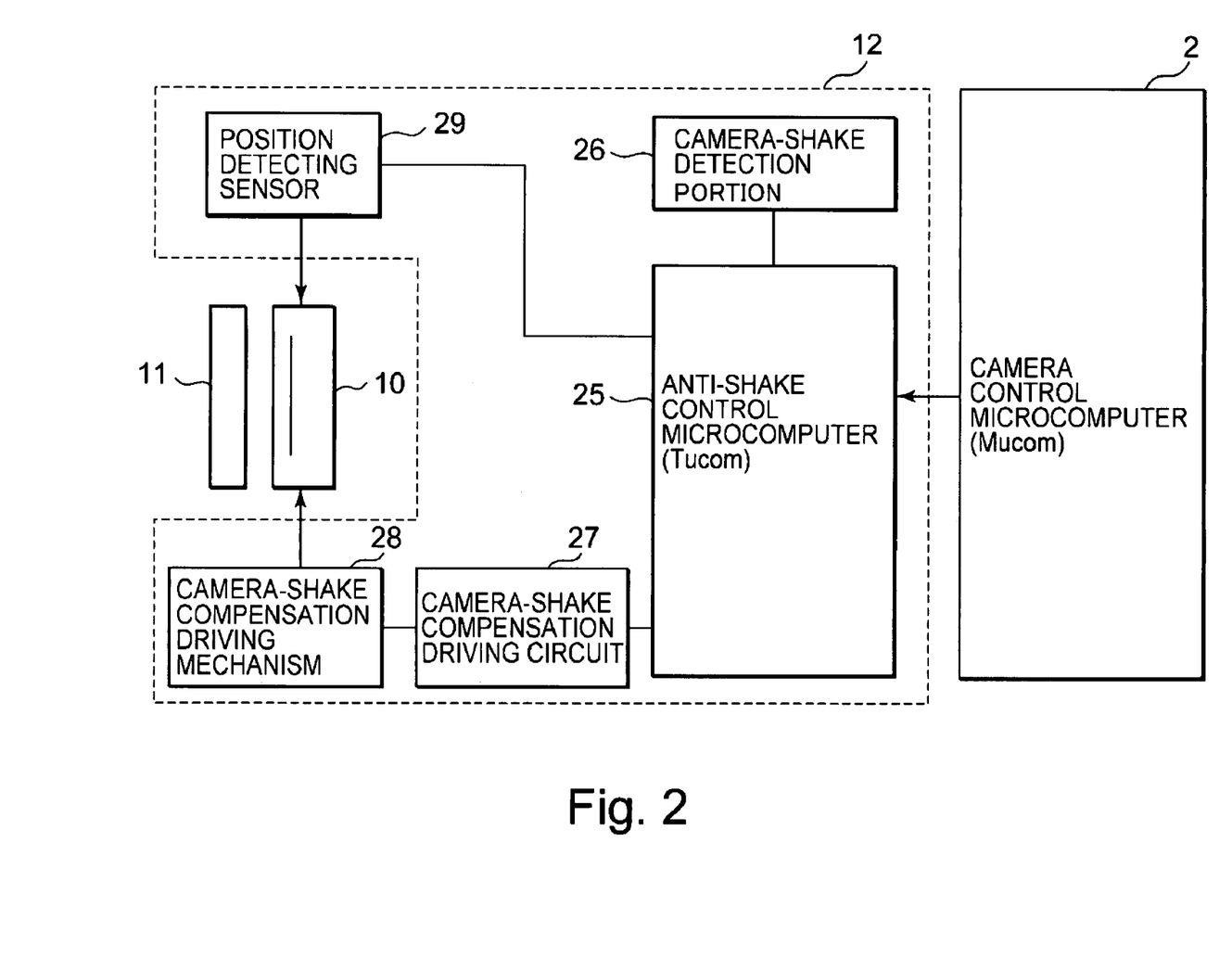
FIG. 2 is a block diagram showing an internal configuration of an anti-shake unit.

FIG. 2 is a block diagram showing an internal configuration of the anti-shake unit 12.

In FIG. 2, the anti-shake unit 12 is connected to the CCD unit 10 as mentioned above, and controlled by an anti-shake control microcomputer (hereinafter called "Tucom") 25. The Tucom 25 and the Mucom 2 are electrically connected to each other so that the Tucom 25 will operate in accordance with instructions from the Mucom 2. Any shake of the camera 1 is detected by a camera-shake detection portion 26 (for example, a set of angular velocity sensors), and its output signal is input into the Tucom 25.

The camera-shake detection portion 26 detects camera movements about two different axes perpendicular to an imaging optical axis (for example, the movements of the camera 1 in the pitch and yaw directions) as the shake of the camera 1.

The Tucom 25 calculates the amount of camera-shake compensation based on the output signal from the camera-shake detection portion 26, and sends a signal corresponding to the amount of camera-shake compensation to a camera-shake compensation driving circuit 27. The CCD unit 10 is driven by a motor, not shown, in a camera-shake compensation mechanism 28, which operates on an electrical signal generated by the camera-shake compensation driving circuit 27. The position to which the CCD unit 10 is driven is detected by a position detecting sensor 29 and sent to the Tucom 25 for feedback control.

Figure 3:
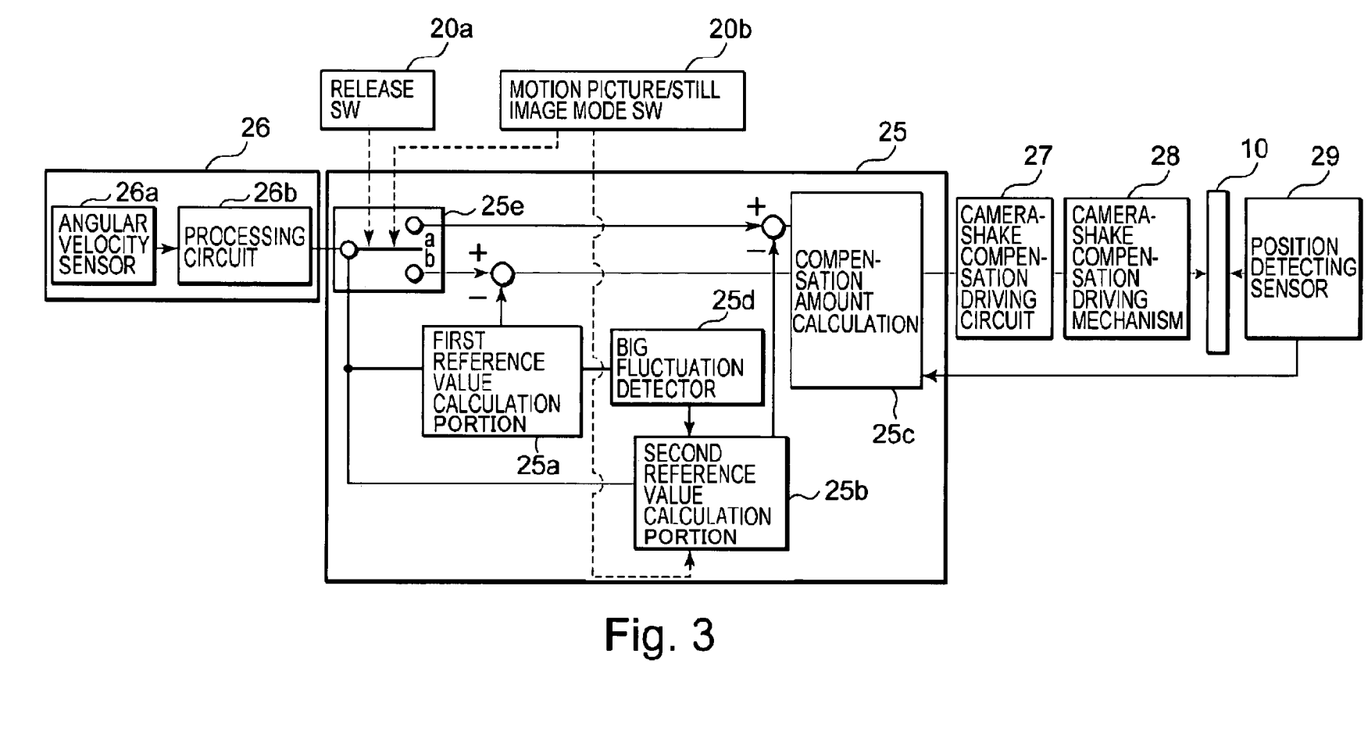
FIG. 3 is a block diagram showing more details of the internal configuration of the anti-shake unit.

FIG. 3 is a block diagram showing more details of the internal configuration of the anti-shake unit 12.

Note in FIG. 3 that the internal configurations of the camera-shake detection portion 26 and the Tucom 25 include components related to camera-shake compensation about one of the two different axes perpendicular to the imaging optical axis. However, the illustration of the components related to the other axis is omitted. This is because the components related to camera-shake compensation about the other axis are the same as those related to camera-shake compensation about the one axis. Note that, although the configuration and operation related to camera-shake compensation only about the one axis are described below, the configuration and operation related to camera-shake compensation about the other axis are the same as those about the one axis to be described below.

In FIG. 3, the camera-shake detection portion 26 has an angular velocity sensor 26a and a processing circuit 26b so that an output signal from the angular velocity sensor 26a detecting camera shake about the one axis will be amplified and A/D converted through the processing circuit 26b. The processed signal is input into the Tucom 25.

In the Tucom 25, based on the signal input from the camera-shake detection portion 26 (hereinafter called a "fluctuating signal" or "fluctuating angular velocity signal"), a first reference value calculation portion 25a calculates a first reference value and a second reference value calculation portion 25b calculates a second reference value.

The first reference value is used for motion picture compensation. The first reference value calculation portion 25a performs calculations in such a manner that the calculated first reference value will vary following the fluctuating signal at low frequency as shown in FIG. 4A. These calculations are made using any one of possible method, such as a method of calculating the moving average value of the fluctuating signal for a relatively short period of time, or a method of removing high-frequency components using a lowpass filter the cut-off frequency of which is relatively high. The first reference value determined through the calculations is subtracted from the fluctuating signal to obtain a signal from which the low-frequency components of the fluctuating signal have been removed as shown in FIG. 4B. Then, based on this signal, the first reference value calculation portion 25a determines the amount of compensation, thus making it possible to calculate the amount of shake compensation suitable for motion picture.

The second reference value is used for still image compensation. The second reference value calculation portion 25b performs calculations after the main power switch is turned on and before an exposure is performed for still image capturing. These calculations are made using any one of possible methods, such as a method of calculating the moving average value of the fluctuating signal for a relatively long period of time, or a method of determining DC components using a lowpass filter the cut-off frequency of which is relatively low.

Figure 4C:
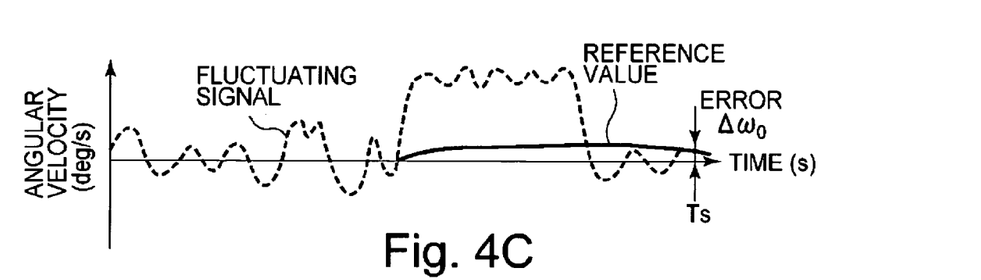
FIG. 4C is a graph showing such a case that the reference value shifts in a direction in which a big fluctuation in the fluctuating signal has been caused.
Figure 5A:
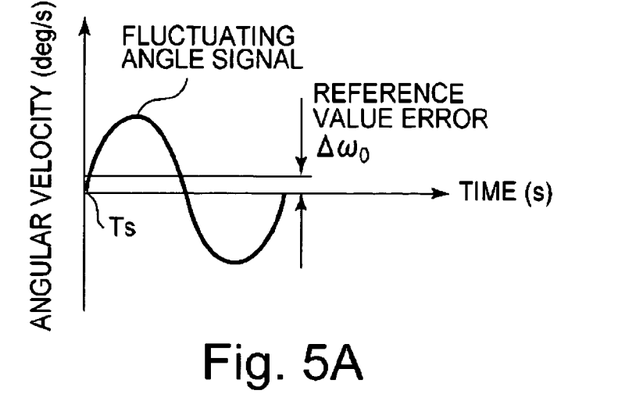
FIG. 5A is a graph showing an example of a fluctuating angular velocity signal.
Figure 5B:
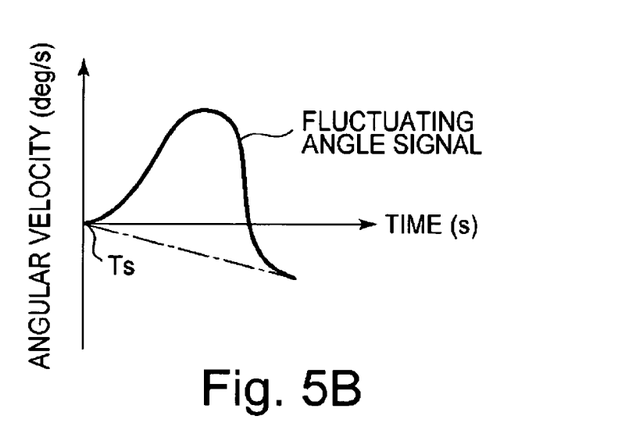
FIG. 5B is a graph showing an example of a fluctuating angle signal to which an error component $\Delta\omega 0$ has been added up.
Figure 5C:
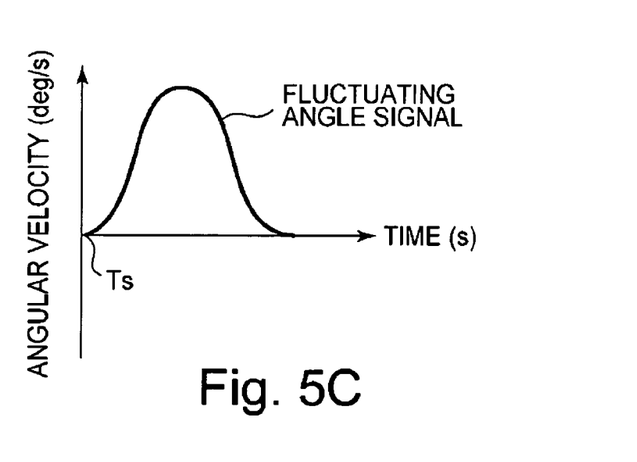
FIG. 5C is a graph showing an example of an actual fluctuating angle signal.

In this case, however, if there is a big camera shake due to a composition change made by the user or for other reasons, the second reference value will shift in a direction in which the big camera shake has occurred. For example, as shown in FIG. 4C, if the user instructs to start still image capturing at time Ts, the second reference value finally determined is a value deviated from an angular velocity value of zero by $\Delta\omega0$. After that, if a fluctuating angular velocity signal as shown in FIG. 5A is generated during exposure of a still image, since an integral operation is performed on the fluctuating signal from which the second reference value with the error component of $\Delta\omega0$ has been subtracted to calculate the amount of compensation, a fluctuating angle signal to which the error component of $\Delta\omega0$ has been added up is generated as shown in FIG. 5B, that is, an actual fluctuating angle signal as shown in FIG. 5C cannot be obtained. This makes it impossible to compensate for camera shake accurately, and hence to obtain a blur-suppressed still image.

Figure 4D:
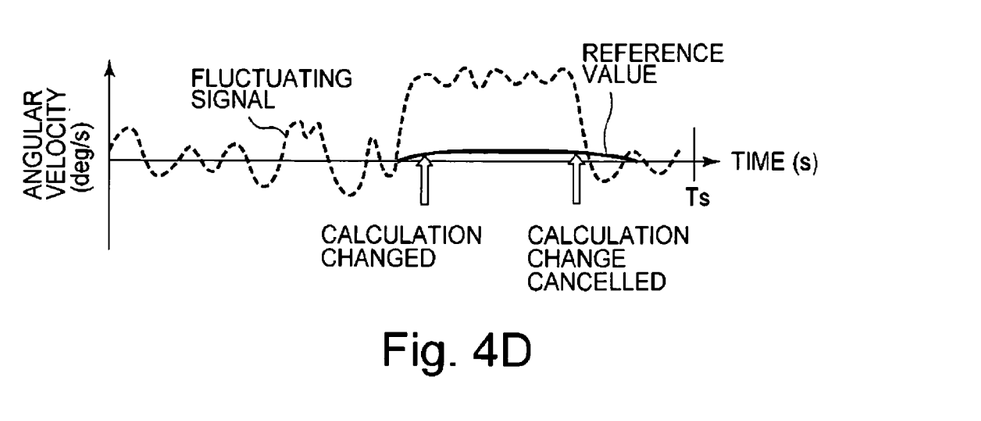
FIG. 4D is a graph showing such a case that the reference value is prevented from shifting in the direction in which the big fluctuation in the fluctuating signal has been caused.

Therefore, with respect to the first reference value calculated by the first reference value calculation portion 25a, the amount of shifting in the direction in which a big camera shake (that is, a big fluctuation in the output signal from the angular velocity sensor) has occurred as shown in FIG. 4A is detected by a big fluctuation detector 25d. Then, as shown in FIG. 4D, the calculation for the second reference value is changed according to the detection results of the big fluctuation detector 25d to prevent the second reference value from shifting in the direction in which the big camera shake has occurred. The above-mentioned control is performed by the Tucom 25. In other words, the big fluctuation is detector 25d starts detecting the big camera shake (that is, the big fluctuation in the output signal from the angular velocity sensor) based on the first reference value calculated by the first reference value calculation portion 25a to change the calculation performed by the second reference value calculation portion 25b. Then, after the completion of detection of the big signal fluctuation, the change in the calculation for the second reference value is cancelled. This makes it possible to substantially reduce errors in calculating the second reference value for still image compensation caused by the big camera shake.

For example, even if the user instructs to start still image capturing in FIG. 4D at the same time as time Ts in FIG. 4C, since the error component $\Delta\omega 0$ of the reference value is minimized, the fluctuating angle signal close to a theoretical value can be calculated. This makes it possible to compensate for camera shake accurately, and hence to obtain a blur-suppressed still image.

Figure 6:
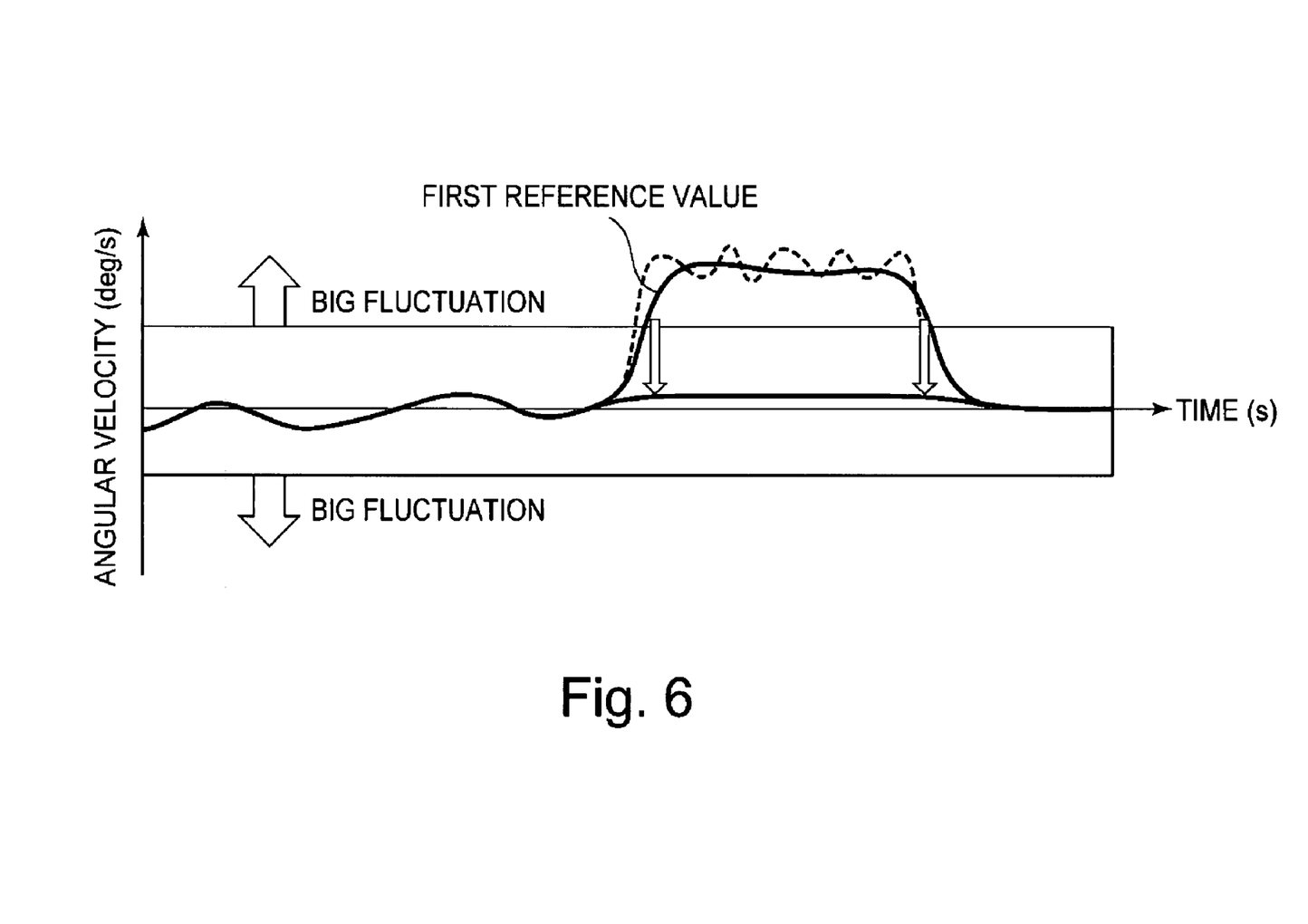
FIG. 6 is an illustration for explaining a big fluctuation detecting method for a big fluctuation detector.

As shown in FIG. 6, the big fluctuation detector 25d starts detecting a big signal fluctuation when the first reference value exceeds a predetermined range, and finishes detecting the big signal fluctuation when the first reference value returns to the predetermined range. The predetermined range is set to have the same width of values both on the positive and negative sides with reference to the second reference value before the occurrence of the big signal fluctuation.

Further, the calculation using the second reference value calculation portion 25b is changed when the big signal fluctuation is detected in such a manner to stop the calculations for the second reference value while maintaining the second reference value just before the second reference value calculation portion 25b stops calculating. Alternatively, the second reference value just before the start of the big signal fluctuation is stored to keep on calculating the second reference value based on the stored reference value instead of the input signal from the processing circuit 26b. Any one of these or other possible ways of changing the method of calculation may be adopted.

A calculation change SW 25e is flipped according to the states of a release SW 20a and a motion picture/still image mode SW 20b. When the motion picture/still image mode SW 20b is set to a motion picture mode, the calculation change SW 25e is connected to b side to calculate the amount of compensation using the first reference value determined by the first reference value calculation portion 25a, thus performing compensation best suited to motion picture blur. Note that the second reference value calculation portion 25b does not perform calculations in the motion picture mode.

On the other hand, when the motion picture/still image mode SW 20b is set to a still image mode, if the user is framing the composition before instructing to start capturing (start exposure) with an operation of the release SW 20a, the calculation change SW 25e is connected to b side to calculate the amount of compensation using the first reference value determined by the first reference value calculation portion 25a, thus performing compensation best suited to motion picture blur. Then, if the user instruct to start capturing (start exposure) with the operation of the release SW 20a, the calculation change SW 25e is connected to a side to calculate the amount of compensation using the second reference value determined by the second reference value calculation portion 25b, thus performing compensation best suited to still image blur. Note that the calculations using the second reference value calculation portion 25b for the second reference value and the calculations using the first reference value calculation portion 25a for the first reference value are performed concurrently in the still image mode.

A compensation amount calculation portion 25c calculates the amount of compensation based on a signal obtained by subtracting the first reference value, output from the first reference value calculation portion 25a, from the fluctuating signal. Or the compensation amount calculation portion 25c calculates the amount of compensation based on a signal obtained by subtracting the second reference value—output from the second reference value calculation portion 25b—from the fluctuating signal, and the output signal from the position detection sensor 29.

Figure 7:
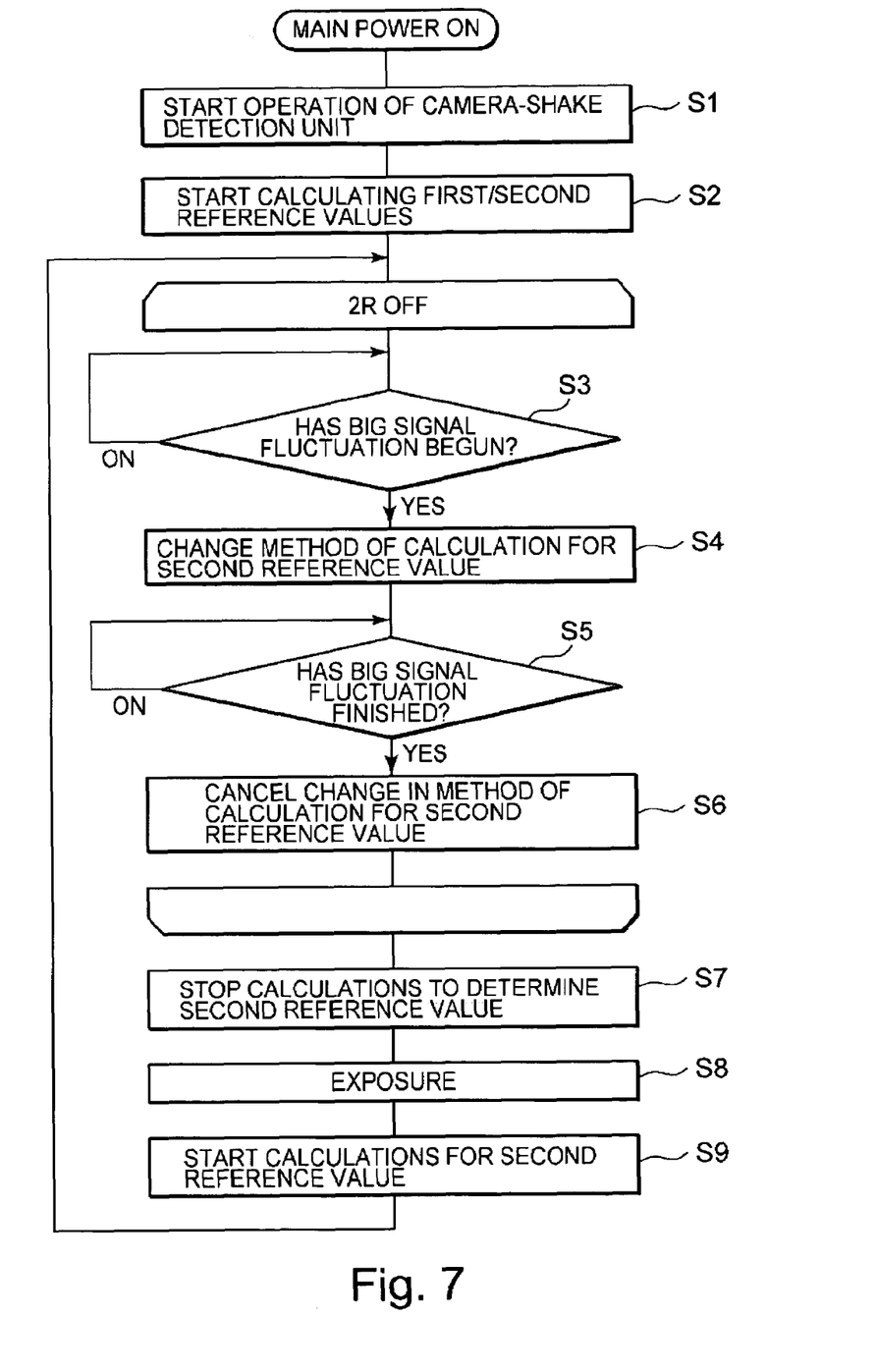
FIG. 7 is a flowchart for explaining the operation of first and second reference value calculation portions at the time of still image capturing.

The following describes the operation of the first and second reference value calculation portions 25a and 25b at the time of still image capturing with reference to FIG. 7.

FIG. 7 is a flowchart for explaining the operation.

As shown in FIG. 7, when the user turns on the main power (that is, when the user turns on the power SW), the camera-shake detection portion 26 starts detecting camera shake (Step (hereinafter simply abbreviated as "S") 1). When the detection of camera shake is started, a fluctuating signal as the output signal from the camera-shake detection portion 26 is input into the Tucom 25 so that the first reference value calculation portion 25a and the second reference value calculation portion 25b will start calculating the first reference value and the second reference value, respectively (S2).

After S2, the following processing for repeating S3 to S6 is performed until the user instructs to start capturing (start exposure) with the operation of the release SW 20a, that is, during "2R OFF" in FIG. 7.

First, it is determined whether the big fluctuation detector 25d has started to detect a big signal fluctuation with respect to the first reference value calculated by the first reference value calculation portion 25a (S3). If the determination result is YES, the calculations performed by the second reference value calculation portion 25b is changed (S4), while if it is NO, the determination is repeated. After S4, it is next determined whether the big fluctuation detector 25d has finished to detect the big signal fluctuation with respect to the first reference value calculated by the first reference value calculation portion 25a (S5). If the determination result is YES, the change in the method of calculation performed by the second reference value calculation portion 25b is cancelled (S6), while if it is NO, the determination is repeated.

While the processing for repeating S3 to S6 is being performed; if the user instructs to start capturing (start exposure) with the operation of the release SW 20a (that is, when 2R becomes ON), the second reference value calculation portion 25b stops calculating and maintains the second reference value just before the second reference value calculation portion 25b stops calculating (S7). Then, an exposure is performed (S8), and after the completion of exposure, the state of the second reference value calculation portion 25b set in S7 to stop calculating and maintain the second reference value is reset to start calculating (S9). Then the procedure returns to the processing for repeating S3 to S6.

The compensation operation at the time of still image capturing is next described with reference to FIG. 8.

Figure 8:
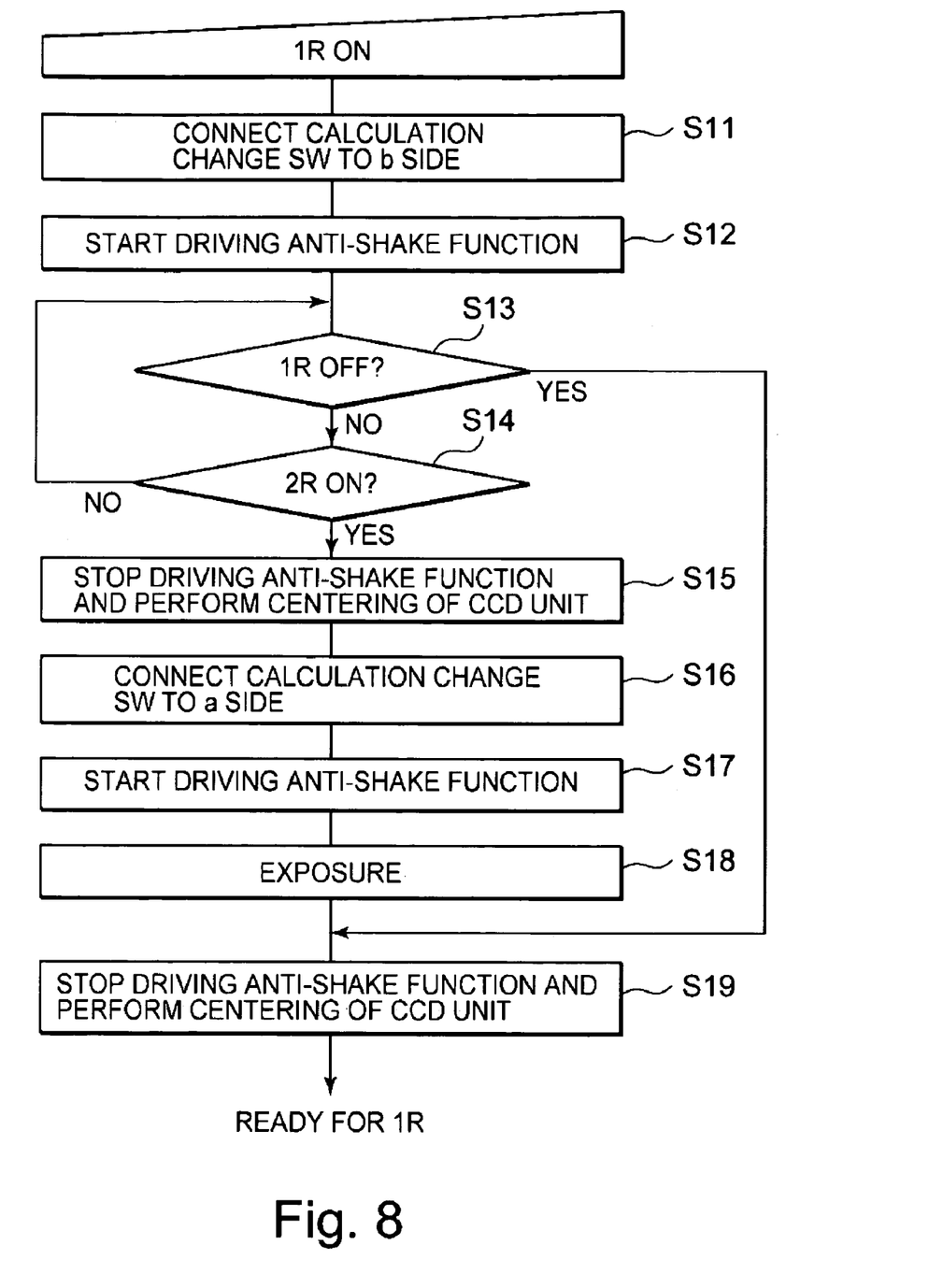
FIG. 8 is a flowchart for explaining compensation operation at the time of still image capturing.

FIG. 8 is a flowchart for explaining the operation.

Note that this operation is not performed before the user instructs to start getting ready for capturing with the operation of the release SW 20a (before 1R becomes ON), that is, this operation is initiated when the user instructs to start getting ready for capturing (when 1R becomes ON).

As shown in FIG. 8, when the user instructs to start getting ready for capturing with the operation of the release SW 20a (when 1R becomes ON), the digital camera 1 connects the calculation change SW 25e to b side (S11) to calculate the amount of compensation using the first reference value so as to start driving the anti-shake function (S12).

It is then determined whether the instruction to start getting ready for capturing with the operation of the release SW 20a is terminated, that is, whether 1R becomes OFF (S13). If the determination result is YES, the driving of the anti-shake function started at S12 is stopped while performing the centering of the CCD unit 10 (S19), and the procedure waits for the next instruction to start getting ready for capturing (ready for 1R).

On the other hand, if the determination result in S13 is NO, it is then determined whether the start of capturing is instructed with the operation of the release SW 20a, that is, whether 2R becomes ON (S14). If the determination result is NO, the procedure returns to S13, while if it is YES, the driving of the anti-shake function started at S12 is stopped while performing the centering of the CCD unit 10 (S15), and the calculation change SW 25e is connected to a side (S16). After that, the amount of compensation is calculated using the second reference value maintained by the processing S7 in FIG. 7 to start driving the anti-shake function (S17). Then, an exposure is performed (S18), and after the completion of exposure, the driving of the anti-shake function is stopped while performing the centering of the CCD unit 10 (S19), and the procedure waits for the next instruction to start getting ready for capturing (ready for 1R).

According to the embodiment, optimum compensation can be performed for motion picture capturing or during framing the composition before still image capturing, while the reference value used for calculating the amount of camera-shake compensation at the time of still image capturing can be calculated while minimizing the influence of a big camera shake due to a change in composition or the like. This makes it possible to compensate for still image blur with a high degree of accuracy.

In the embodiment, the CCD unit 10 is shifted to compensate for camera shake, but the present invention is not limited to this way of camera-shake compensation. For example, part of the imaging lens system may be shifted, or the camera-shake compensation may be performed electronically.

An imaging apparatus according to a second embodiment of the present invention is different from that according to the first embodiment in the configuration of the anti-shake unit. Therefore, only the configuration and operation of the anti-shake unit according to this embodiment are described in detail below.

Figure 9:
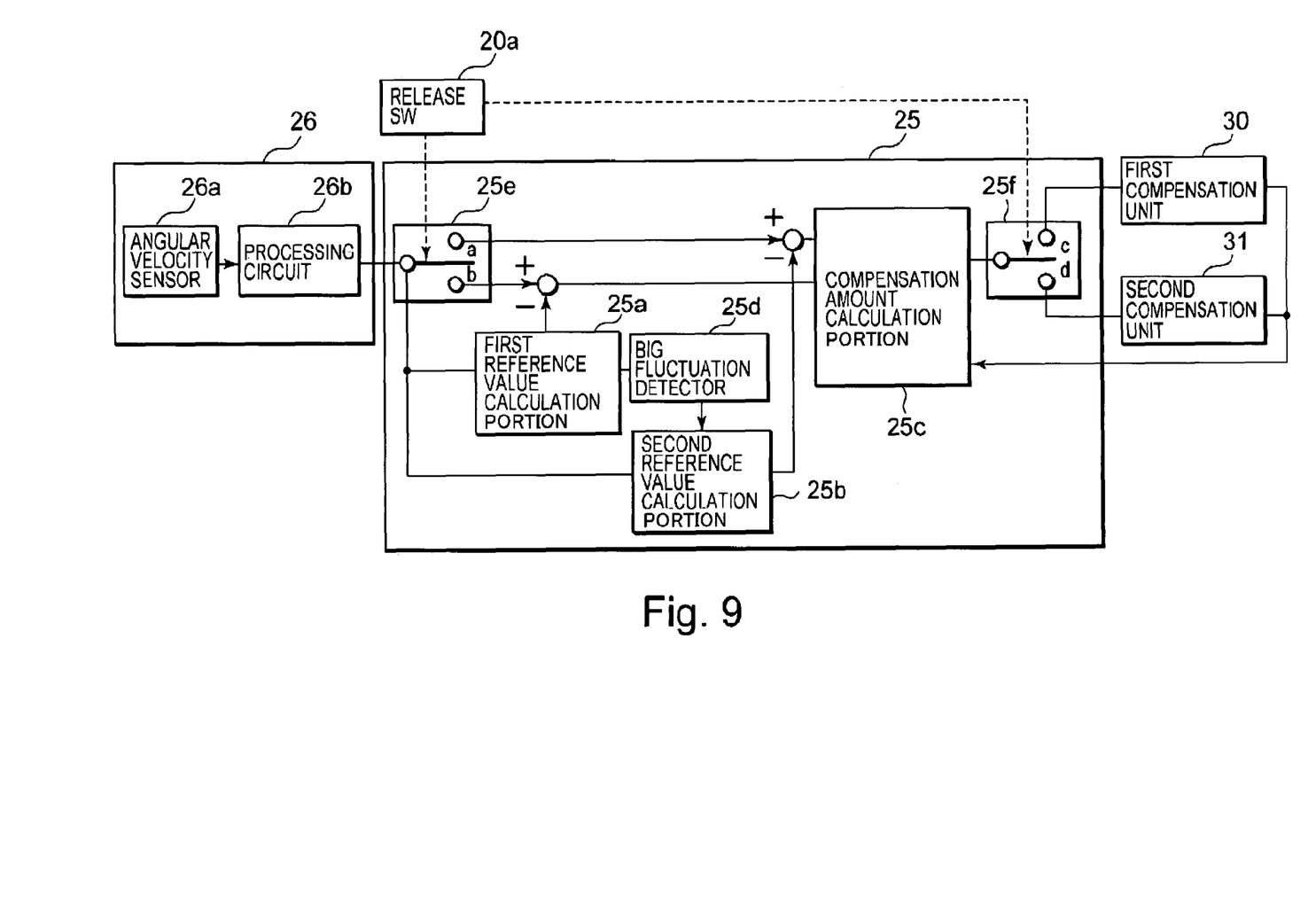
FIG. 9 is a block diagram showing an internal configuration of an anti-shake unit according to a second embodiment of the present invention.

FIG. 9 is a block diagram showing the details of an internal configuration of the anti-shake unit according to this embodiment. FIG. 9 corresponds to FIG. 3, and the components shown in FIG. 3 are given the same reference numerals in FIG. 9.

As shown in FIG. 9, the anti-shake unit according to this embodiment has two compensation units, that is, a first compensation unit 30 and a second compensation unit 31, so that a compensation system change SW 25f will select either of them to perform camera-shake compensation.

To be more specific, the first compensation unit 30 electronically changes the cutout position of an image on the image pickup device to cancel out camera shake during motion picture capturing or during framing before still image capturing, thus performing camera-shake compensation. The second compensation unit 31 mechanically shifts the relative position between the entire or part of the imaging lens system and the image pickup device in the direction perpendicular to the optical axis at the time of still image capturing, thus performing camera-shake compensation.

Figure 10:
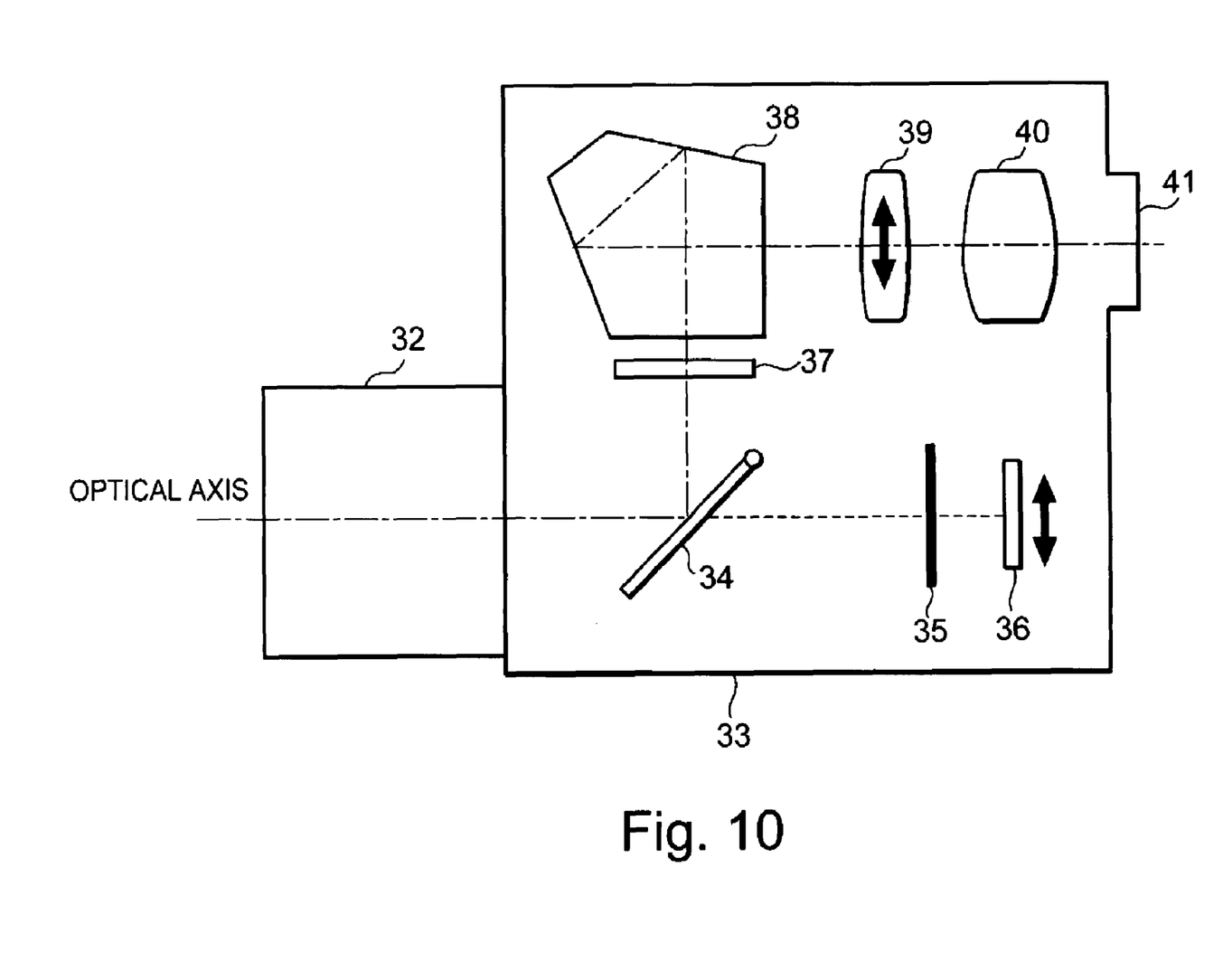
FIG. 10 is an illustration for explaining another example of first and second compensation units.

Alternatively, camera-shake compensation units may be provided as shown in FIG. 10 in a finder optical system and an imaging system, respectively, instead of the above-mentioned two compensation units. In this case, a compensation optical system 39 that forms part of the finder optical system performs camera-shake compensation during motion picture capturing or during framing before still image capturing, while an image pickup device 36 is shifted at the time of still image capturing to perform camera-shake compensation. In FIG. 10, reference numeral 32 designates a lens unit, reference numeral 33 designates a camera body, reference numeral 34 designates a quick-return mirror, reference numeral 35 designates a shutter, reference numeral 37 designates a focusing screen, reference numeral 38 designates a pentaprism, reference numeral 40 designates a finder optical system, and reference numeral 41 designates a finder.

Figure 11:
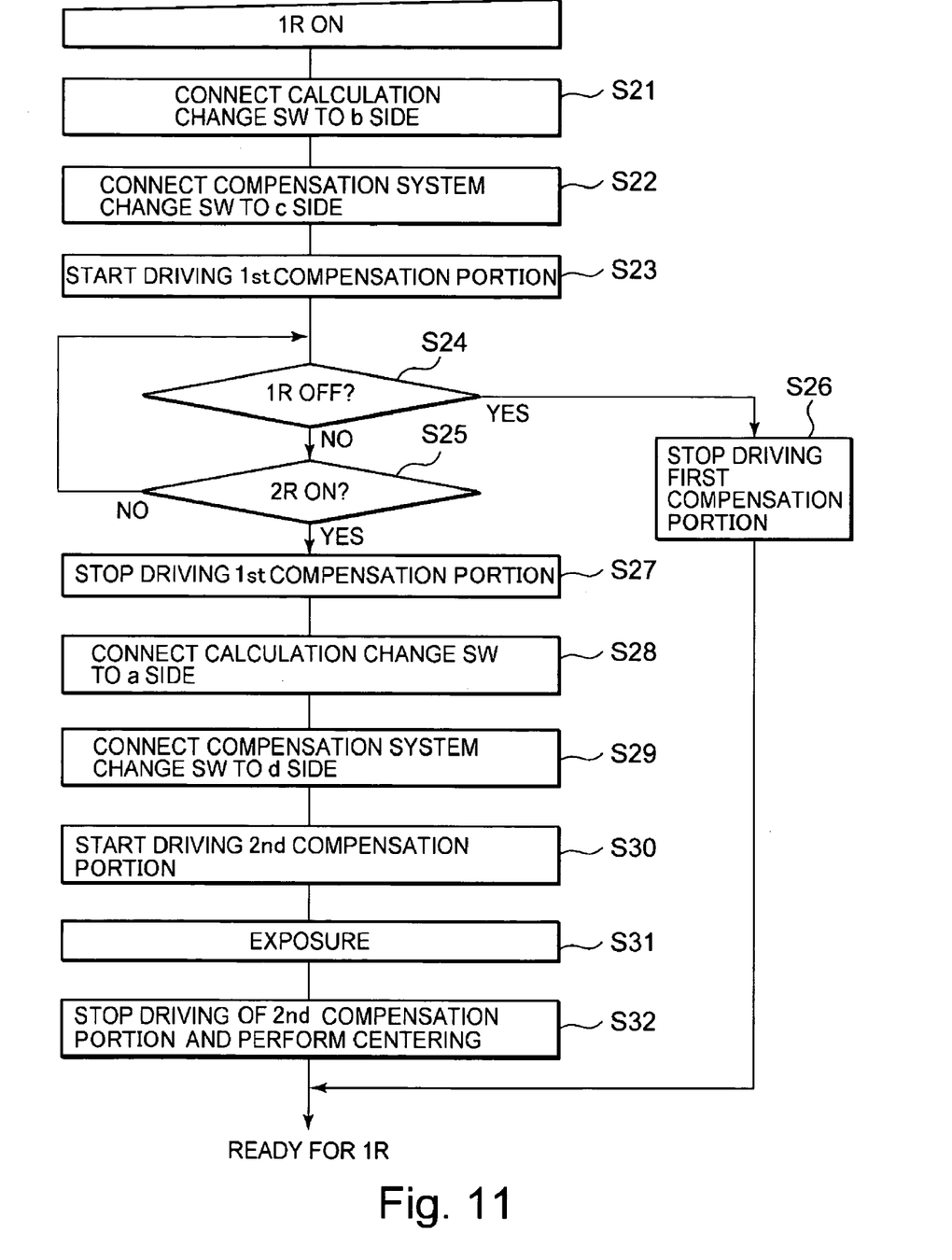
FIG. 11 is a flowchart for explaining compensation operation at the time of still image capturing according to the second embodiment of the present invention.

The following describes the compensation operation at the time of still image capturing according to the embodiment with reference to FIG. 11. In the embodiment, the operation of the first and second reference value calculation portions 25a and 25b at the time of still image capturing is the same as that described with reference to FIG. 7, and the description thereof will be omitted.

FIG. 11 is a flowchart for explaining the compensation operation at the time of still image capturing according to the embodiment. FIG. 11 corresponds to FIG. 8.

As shown in FIG. 11, when the user instructs to start getting ready for capturing with the operation of the release SW 20a (when 1R becomes ON), the digital camera 1 connects the calculation change SW 25e to b side (S21) and the compensation system change SW 25f to c side (S22). Then, the amount of compensation is calculated using the first reference value to start driving the first compensation unit 30 to perform camera-shake compensation according to the amount of compensation calculated (S23).

It is then determined whether the instruction to start getting ready for capturing with the operation of the release SW 20a is terminated, that is, whether 1R becomes OFF (S24). If the determination result is YES, the first compensation unit 30 stops driving the anti-shake function (S25) and the procedure waits for the next instruction to start getting ready for capturing (ready for 1R).

On the other hand, if the determination result in S24 is NO, it is then determined whether the start of capturing is instructed with the operation of the release SW 20a, that is, whether 2R becomes ON (S26). If the determination result is NO, the procedure returns to S24, while if it is YES, the first compensation unit 30 stops driving the anti-shake function (S27), the calculation change SW 25e is connected to a side (S28), and the compensation system change SW 25f is connected to d side (S29). After that, the amount of compensation is calculated using the second reference value maintained by the processing S7 in FIG. 7 so that the second compensation unit 31 will start driving the anti-shake function (S30). Then, an exposure is performed (S31), and after the completion of exposure, the second compensation unit 31 stops driving the anti-shake function while performing the centering of the second compensation unit 31 (S32), and the procedure waits for the next instruction to start getting ready for capturing (ready for 1R).

According to the embodiment, optimum compensation can be performed for motion picture capturing or during framing the composition before still image capturing, while the reference value used for calculating the amount of camera-shake compensation at the time of still image capturing can be calculated while minimizing the influence of a big camera shake due to a change in composition or the like. This allows the first compensation unit 30 to compensate for still image blur with a high degree of accuracy.

In the embodiment, the operation of the first compensation unit 30 and the operation of the second compensation unit 31 can be replaced with each other. In this case, the second compensation unit 31 electronically changes the cutout position of an image on the image pickup device to cancel out camera shake during motion picture capturing or during framing before still image capturing, thus performing camera-shake compensation. On the other hand, the first compensation unit 30 mechanically shifts the relative position between the entire or part of the imaging lens system and the image pickup device in the direction perpendicular to the optical axis at the time of still image capturing, thus performing camera-shake compensation.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An imaging apparatus comprising:
a shake detection portion for detecting a shake of the imaging apparatus about two different axes perpendicular to an imaging axes optical axis;
a first reference value calculation portion for calculating a first reference value using a shake detecting signal from the shake detection portion;
a second reference value calculation portion for calculating a second reference value for the shake detecting signal different from that calculated by the first reference value calculation portion, wherein the second reference value calculation portion changes the calculation of the second reference value based on a value related to the first reference value;
a shake compensation amount calculation portion for calculating an amount of shake compensation based on the output of the shake detection portion; and
a shake compensation unit driven based on the output of the shake compensation amount calculation portion,
wherein the shake compensation amount calculation portion calculates the amount of shake compensation using the first reference value before the start of still image capturing,
wherein the imaging apparatus has a motion picture capturing mode for capturing motion picture as one of its operation modes,
wherein the shake compensation amount calculation portion calculates the amount of shake compensation using the first reference value in the motion picture capturing mode, and
wherein the second reference value calculation portion stops calculating in the motion picture capturing mode.

2. An imaging apparatus comprising:
a sensor for detecting a shake of the imaging apparatus;
a microcomputer including a first reference value calculation portion for calculating a reference value to be used in the calculation of shake compensation amount performed before start of a still image capturing procedure; and a second reference value calculation portion for calculating a reference value to be used in the calculation of shake compensation amount performed after start of the still image capturing procedure; and
a mechanism to compensate for shake of the imaging apparatus during the still image capturing procedure using the output of the sensor and the calculation results of the second reference value calculation portion,
wherein when a big shake exceeding a predetermined magnitude is detected in the calculation results of the first reference value calculation portion, the microcomputer performs processing for preventing or at least reducing the influence of the big shake on the calculation of the second reference value calculation portion.

* * * * *